Jan. 4, 1966  H. JACOBS  3,227,209
RECUPERATOR HAVING A GAS CHANNEL IN WHOSE CENTRAL PORTION
ARE DISPOSED HEAT-ABSORBING, AIR-CONDUCTING
RECUPERATOR PIPES
Filed Nov. 1, 1963  3 Sheets-Sheet 1

INVENTOR.
HEINZ JACOBS
BY
Well, Burden, Robinson & Webb
ATTORNEYS.

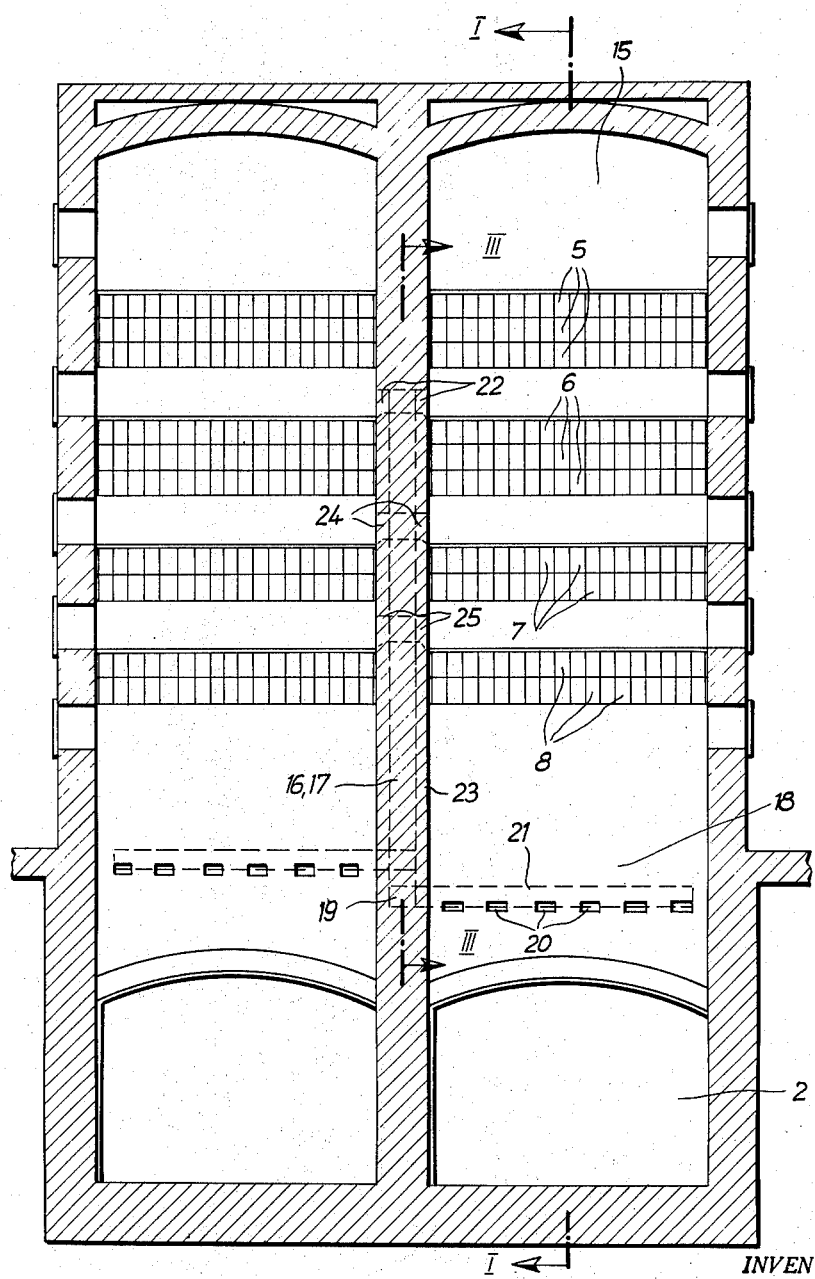

Jan. 4, 1966  H. JACOBS  3,227,209
RECUPERATOR HAVING A GAS CHANNEL IN WHOSE CENTRAL PORTION
ARE DISPOSED HEAT-ABSORBING, AIR-CONDUCTING
RECUPERATOR PIPES
Filed Nov. 1, 1963  3 Sheets-Sheet 3

INVENTOR.
HEINZ JACOBS
BY
Webb, Burdere, Robinson + Webb
ATTORNEYS.

1

3,227,209
RECUPERATOR HAVING A GAS CHANNEL IN WHOSE CENTRAL PORTION ARE DISPOSED HEAT-ABSORBING, AIR-CONDUCTING RECUPERATOR PIPES
Heinz Jacobs, Geldern, Germany, assignor to Industrie-Companie Kleinewefers Konstruktions- und Handelsgesellschaft m.b.H., Krefel, Germany, a corporation of Germany
Filed Nov. 1, 1963, Ser. No. 320,795
Claims priority, application Germany, Nov. 3, 1962, J 22,596
11 Claims. (Cl. 165—145)

This invention relates to a recuperator which has either a Z-shaped or a U-shaped fuel gas channel in whose central portion heat-absorbing, air-conducting recuperator pipes are disposed at right angles to the direction of flow of the fuel gas. For this purpose, the recuperator pipes are generally disposed horizontally in the central portion which is usually vertically disposed, and the inlet and outlet lines of the fuel gas channel are horizontal.

In conventional recuperators of the above type with Z-shaped fuel gas channels, after the fuel gas has passed from the inlet line into the central portion, there is a directional change in the flow of the fuel gas to this extent, that the fuel gas first flows along the wall of the fuel gas channel opposite the inlet line, then flows to the opposite wall of the channel, and next flows from there into the outlet pipe. This flow might be compared to the meandering of a river. Thus, the recuperator pipes which are at right angles to the fuel gas channel are acted upon variably by the fuel gas along their longitudinal extents. While the recuperator pipes located nearest to the fuel gas inlet are affected by the fuel gases at their one end only, the recuperator pipes located nearest to the outlet are affected only at the opposite end of the pipe. The same holds true for U-shaped fuel gas channels.

My invention provides a substantially uniform distribution of the fuel gas over the area of the fuel gas channel at the elevation of the recuperator pipes, and thereby the pipes are acted upon uniformly along substantially their entire length. Specifically, the invention resides in a recuperator having either a Z-shaped or U-shaped fuel gas channel in whose central section the heat-absorbing, air-conducting recuperator pipes or the like are disposed at substantially right angles to the direction of flow of the fuel or hot waste gas. In order to achieve the abovementioned aim of the invention, one or more overflow conduits is disposed parallel or substantially parallel to the central section of the fuel gas channel. One end of the overflow conduits opens below the recuperator pipes into that part of the central section of the fuel gas channel which is adjacent to the inlet of the channel, while the other end also opens into the central section of the fuel gas channel, but in the direction of flow of the fuel gas and behind at least the first air-conducting pipe. Preferably, the ends of the overflow conduits which are the rearward ends with respect to the direction of flow of the fuel gas open into that part of the central section of the fuel gas channel which is opposite the outlet of the channel.

Each of the overflow conduits may be provided with several discharge openings disposed one above the other and capable of being opened as desired so that the active or operating length of the overflow conduits is variable.

2

As a result, the flow of the fuel gas in the central section, particularly at the elevation of the recuperator pipes, may be varied in such a manner that the latter are exposed along their lengths to approximately the same conditions of flow of the fuel gas.

The openings in the overflow conduits are preferably made closable in such a way that the amount of fuel gas flowing through the overflow conduits may be controlled.

In the accompanying drawings, I have shown preferred embodiments of my invention, in which:

FIGURE 2 is a section view along the line II—II of FIGURE 1;

Figure 1:
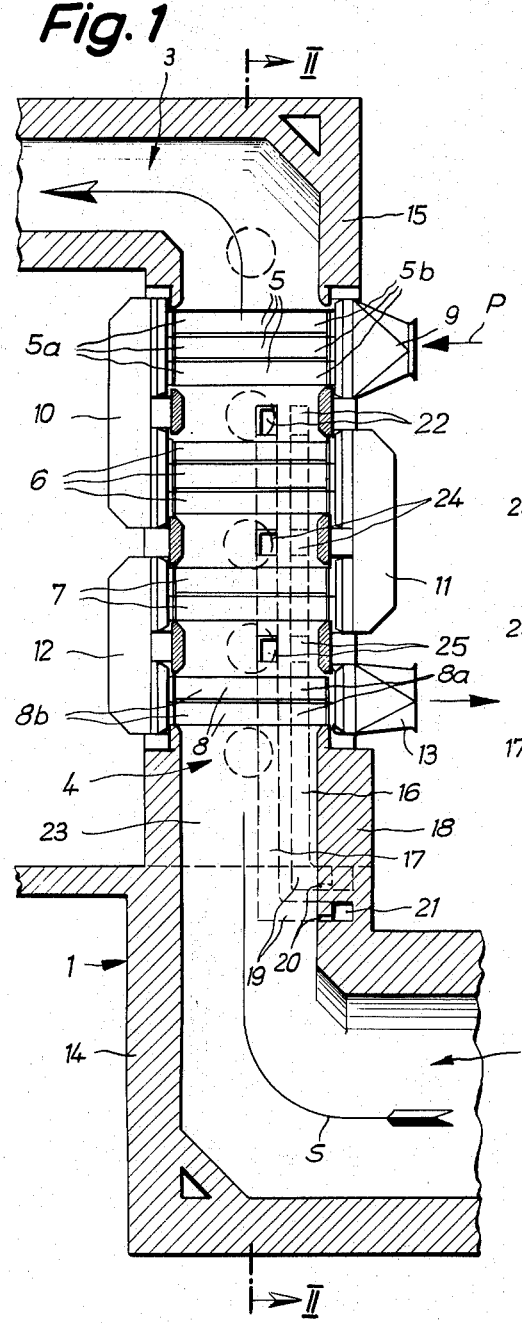
FIGURE 1 is a section view along the line I—I of FIGURE 2, and showing the invention applied to a Z-shaped fuel gas channel.
Figure 3:
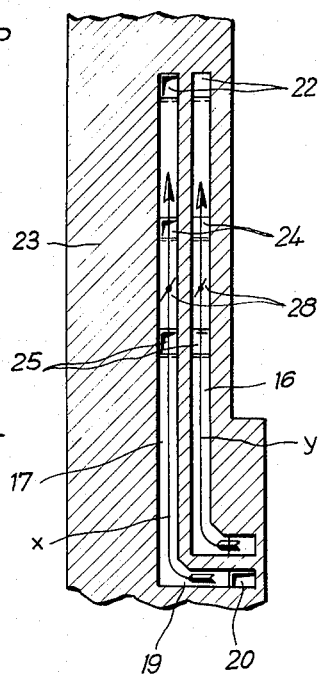
FIGURE 3 is a section view along the line III—III of FIGURE 2.

Referring to FIGURES 1–3, the fuel gas channel 1 of my invention may be made from a pipe of the proper dimension or from a prefabricated channel, and comprises an inlet 2, an outlet 3, and a central section 4 which extends lineally. Into this central section 4 of the fuel gas channel which is vertical or upright, recuperator pipes 5, 6, 7 and 8 are disposed at right angles to the direction of flow of the fuel gas (as shown by arrow S). The air which is to be heated enters a distributor box 9 in the direction indicated by arrow P and then flows through pipes 5 and transfer box 10 into pipes 6 and on through box 11, pipes 7, box 12 and pipes 8 to outlet 13.

When the fuel or hot gas is flowing in the direction indicated by arrow S, after it exits from inlet 2 and enters the vertical central section 4 of the fuel gas channel, it strikes against wall portion 14 at the elevation of the inlet 2 and slightly thereabove. Then the fuel gas changes its direction of flow in transverse through the central section 4 of the fuel gas channel, over to wall 15 and into outlet 3. This causes ends 8a of pipes 8 and ends 5a of pipes 5 to be less affected by the fuel gas than, for example, ends 8b and 5b of pipes 8 and 5. The center portions of pipes 6 and 7 are more strongly affected by the fuel gas than their two ends.

It is the aim of my invention to effect uniform distribution of the flow of the fuel gas in central section 4 over its entire area so that pipes 5 and 8 will be affected uniformly along their entire length. This prevents varying thermal loads on the pipes, and the adverse consequences thereof.

For this purpose, I provide overflow conduits 16 and 17 located parallel or almost parallel to the direction of flow S of the fuel gas in central section 4. The front ends of conduits 16 and 17 open in the direction of flow of the fuel gas into wall portion 18, diagonally across from wall portion 14 by way of connecting lines 19 and 20. In other words, the front ends of the overflow conduits 16 and 17 open into that part of the central section of the fuel gas channel 1 which is adjacent to inlet 2. In a modification of the illustration, the front end of conduits 16 and 17 may also be located in side wall 23 of the channel 1 in the vicinity of wall portion 18.

As shown in FIGURE 2, it is preferable to distribute a plurality of intake openings 20 of overflow conduits 16 or 17 along a wall of channel 1 and to connect them with one another and with connector pipe 19 by a manifold 21.

Those ends of the overflow conduits 16 and 17 which are the rearward or downstream end in respect to the flow of the fuel gas are disposed behind at least first pipes 8. In the example illustrated, such ends of the overflow pipes 16 and 17 have openings 22 located between pipes 5 and 6, in the central section 4 and disposed to deliver the fuel gas transversely across the length of the air pipes. Here, for example, the discharge openings are disposed in side wall 23 in which overflow pipes 16 and 17 are themselves located. Also, the openings 22 are positioned along the lengths of the pipes 5 and 6 closer to wall 18 than to wall 14 as shown in FIGURE 1. Arrows X and Y (FIGURE 3) show the direction of flow of the fuel gas in the overflow conduits 16 and 17.

As shown in FIGURE 2, the side wall 23 is an intermediate one and is used as a divider partition between two adjacent fuel gas channels and the overflow conduits 16 and 17 are common to and serve both fuel gas channels.

In front of their ends with the openings 22, overflow conduits 16 and 17 may be provided with still further discharge openings 24 and 25 by which the operating length of the overflow conduits may be varied. Also, the overflow conduits 16 and 17 may include dampers or butterfly valves 28 to regulate and in some instances close off flow of the fuel gas through the openings 22, 24 and 25. These dampers or butterfly valves are preferably operated from outside the fuel gas channel.

In FIGURES 1–3, the conditions are shown which prevail in a Z-shaped fuel gas channel. When the fuel gas channel is U-shaped, the overflow conduits and the inlet and outlet openings thereof must be suitably disposed so that here, too, the conditions of flow will be made uniform throughout the entire area of the central portion of the fuel gas channel, which will result in having the recuperator pipes, which are at right angles to the direction of flow of the fuel gas, acted upon uniformly along their entire length.

Figure 4:
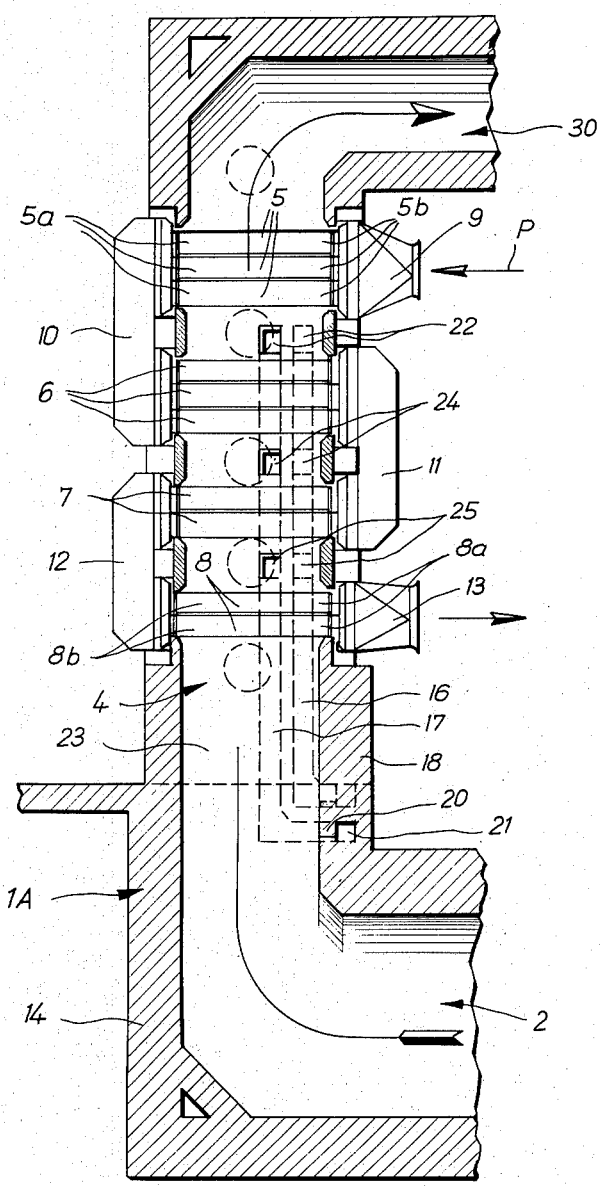
FIGURE 4 is a vertical section view similar to FIGURE 1, but showing the invention applied to a U-shaped fuel gas channel.

FIGURE 4 shows a recuperator which has a U-shaped fuel gas channel 1A whose outlet 30 faces in the opposite direction to that of the outlet 3 in the embodiment of FIGURE 1. The other parts of the recuperator of FIGURE 4 have the same arrangement as their corresponding parts in the recuperator of FIGURE 1 and carry the same reference numerals.

While I have shown and described preferred embodiments of my invention, it may be otherwise embodied within the scope of the appended claims.

I claim:

1. A recuperator having a channel through which flows a heated gas, said channel including a central section which extends substantially lineally, an inlet and an outlet, each of said inlet and outlet being disposed angularly relative to said central section so that said heated gas encounters a change in direction of flow upon entry into and upon exit from said central section, air pipes disposed in said central section substantially transversely of the direction of flow of said heated gas therethrough and of said central section, said air pipes being adapted for flow of air to be warmed therethrough, at least one overflow conduit extending longitudinally of said central section and having an inlet which opens into said channel and which is disposed adjacent said channel inlet and in a position across from that part of said interior surface of said central section which is opposite said channel inlet and against which said heated gas impinges as it enters said central section so that said overflow conduit receives a part of said heated gas, said overflow conduit having at least one outlet which opens into said central section, which is located adjacent said air pipes and is positioned to direct heated gas which flows through said overflow conduit substantially transversely across the lengths of said air pipes disposed in said central section, said outlet of said overflow conduit being further located substantially out of the path of flow of heated gas through said central section.

2. The recuperator of claim 1 characterized by said overflow conduit having means therein for regulating flow of heated gas out through the outlet thereof.

3. A recuperator having a channel through which flows a heated gas, said channel including a central section which extends substantially lineally, an inlet and an outlet, each of said inlet and said outlet being disposed substantially at right angles to said central section, air pipes disposed in said central section substantially transversely of the direction of flow of said heated gas therethrough and of said central section, said air pipes being adapted for flow of air to be warmed therethrough, at least one overflow conduit extending longitudinally of said central section and having an inlet which opens into said channel and which is disposed adjacent said channel inlet and in a position across from that part of said interior surface of said central section which is opposite said inlet and against which said heated gas impinges as it enters said central section so that said overflow conduit receives a part of said heated gas, said overflow conduit having a plurality of spaced apart outlets which open into said central section, which are adjacent said air pipes, which are disposed along at least a portion of the length of said air pipes and are positioned to direct heated gas substantially transversely across the lengths of said air pipes disposed in said central section.

4. The recuperator of claim 3 characterized by said overflow conduit having means therein for regulating flow of heated gas out through the outlet thereof.

5. The recuperator of claim 3 characterized by said air pipes comprising at least two spaced apart groups of pipes and by said overflow conduit having a first group of outlets disposed adjacent said first group of air pipes and a second group of outlets disposed adjacent said second group of air pipes.

6. The recuperator of claim 5 characterized by said overflow conduit having means for regulating the flow of heated gas out through each of said outlets thereof.

7. In a recuperator having a channel through which flows a heated gas, said channel including a central section which extends substantially lineally, an inlet and outlet, each of said inlet and outlet being disposed angularly relative to said central section so that said heated gas encounters a change in direction of flow upon entry into and upon exit from said central section, air pipes disposed in said central section substantially transversely of the direction of flow of said heated gas therethrough and of said central section, said air pipes being adapted for flow of air to be warmed therethrough, the invention comprising at least one overflow conduit extending longitudinally of said central section and having an inlet which opens into said channel and which is disposed adjacent said inlet of said channel inlet and in a position across from that part of said interior surface of said central section which is opposite said inlet and and against which said heated gas impinges as it enters said central section so that said overflow conduit receives a part of said heated gas, said overflow conduit having at least one outlet which opens into said central section, which is located adjacent said air pipes and is positioned to direct heated gas which flows through said overflow conduit substantially transversely across the lengths of said air pipes disposed in said central section.

8. The recuperator of claim 7 characterized by said overflow conduit having means therein for regulating flow of heated gas out through the outlet thereof.

9. The recuperator of claim 1 characterized by said outlet of said overflow conduit being located along that portion of the length of said air pipes which portion is nearer the plane of said overflow conduit inlet than the plane of said interior surface of said central section which is opposite said channel inlet.

10. The recuperator of claim 3 characterized by said outlets of said overflow conduit being located along that portion of the length of said air pipes which portion is nearer the plane of said overflow conduit inlet than the plane of said interior surface of said central section which is opposite said channel inlet.

11. The invention of claim 7 characterized by said outlet of said overflow conduit being located along that portion of the length of said air pipes which portion is nearer the plane of said overflow conduit inlet than the plane of said interior surface of said central section which is opposite said channel inlet.

References Cited by the Examiner

UNITED STATES PATENTS

| | | | |
|---|---|---|---|
| 2,594,471 | 4/1952 | Marshall | 165—145 |
| 2,683,590 | 7/1954 | Baver | 165—35 |

ROBERT A. O'LEARY, *Primary Examiner.*

CHARLES SUKALO, *Examiner.*